United States Patent [19]
Hamada et al.

[11] Patent Number: 6,023,707
[45] Date of Patent: Feb. 8, 2000

[54] ON-LINE DATABASE DUPLICATION WITH INCORPORATION OF CONCURRENT DATABASE UPDATES

[75] Inventors: Yukihiro Hamada, Kawasaki; Kazuo Ishihara; Toshihiko Masumoto, both of Kobe; Tsuyoshi Fujita, Kawanishi; Katsutoshi Masatomi, Kobe; Yoshihisa Takeda, Kobe; Masayuki Kawashima, Kobe, all of Japan

[73] Assignee: Fujitsu Limited, Kawasaki, Japan

[21] Appl. No.: 09/000,809

[22] Filed: Dec. 30, 1997

[30] Foreign Application Priority Data

Jan. 16, 1997 [JP] Japan ................................ 9-005453

[51] Int. Cl.[7] .................................................. G06F 11/08
[52] U.S. Cl. ................... 707/202; 707/204; 395/182.04; 395/182.09; 395/182.11
[58] Field of Search ..................................... 707/201, 202, 707/203, 204; 395/675, 676, 182.09, 182.04, 182.11

[56] References Cited

U.S. PATENT DOCUMENTS

| | | | |
|---|---|---|---|
| 4,751,635 | 6/1988 | Kret | 707/10 |
| 5,043,871 | 8/1991 | Nishigaki et al. | 707/204 |
| 5,287,496 | 2/1994 | Chen et al. | 707/203 |
| 5,321,832 | 6/1994 | Goldring | 707/201 |
| 5,379,398 | 1/1995 | Cohn et al. | 707/202 |
| 5,381,545 | 1/1995 | Baker et al. | 707/202 |
| 5,404,508 | 4/1995 | Konrad et al. | 707/202 |
| 5,423,037 | 6/1995 | Hvasshovd | 707/10 |
| 5,594,900 | 1/1997 | Cohn et al. | 707/202 |
| 5,603,024 | 2/1997 | Goldring | 707/203 |
| 5,613,113 | 3/1997 | Goldring | 707/202 |
| 5,623,669 | 4/1997 | Kincaid | 395/621 |
| 5,668,991 | 9/1997 | Dunn et al. | 707/202 |
| 5,671,350 | 9/1997 | Wood | 395/182.13 |
| 5,842,222 | 11/1998 | Lin et al. | 707/202 |
| 5,852,715 | 12/1998 | Raz et al. | 395/200.31 |
| 5,873,096 | 2/1999 | Lim et al. | 707/201 |

OTHER PUBLICATIONS

Sockut et al., "A method for on-line reorganization of a database", IBM Systems Journal, vol.36, No. 3, abstract only, 1997.

*Primary Examiner*—Jean R. Homere
*Attorney, Agent, or Firm*—Staas & Halsey

[57] ABSTRACT

A system is provided for duplication of an update database in a computer using partial data extraction. A copying module creates a copy database, including a partial copy, of the update database. A journal selecting module selects data, related to parts of the copy database in which the copy has finished, from an update data journal of the update database that is made when the copy database is being copied by the copying module. A duplication module updates the contents of the copy database created by the copying module with the contents of the update data journal selected by the journal selecting module.

20 Claims, 16 Drawing Sheets

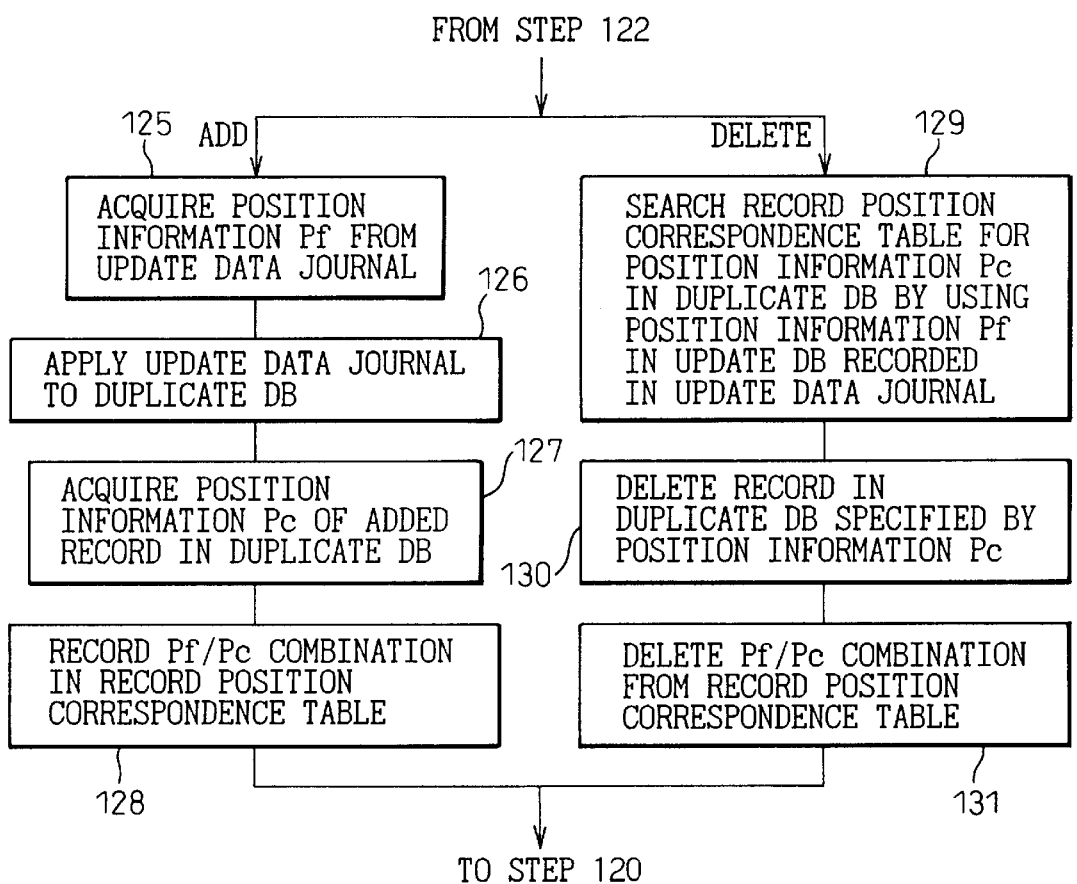

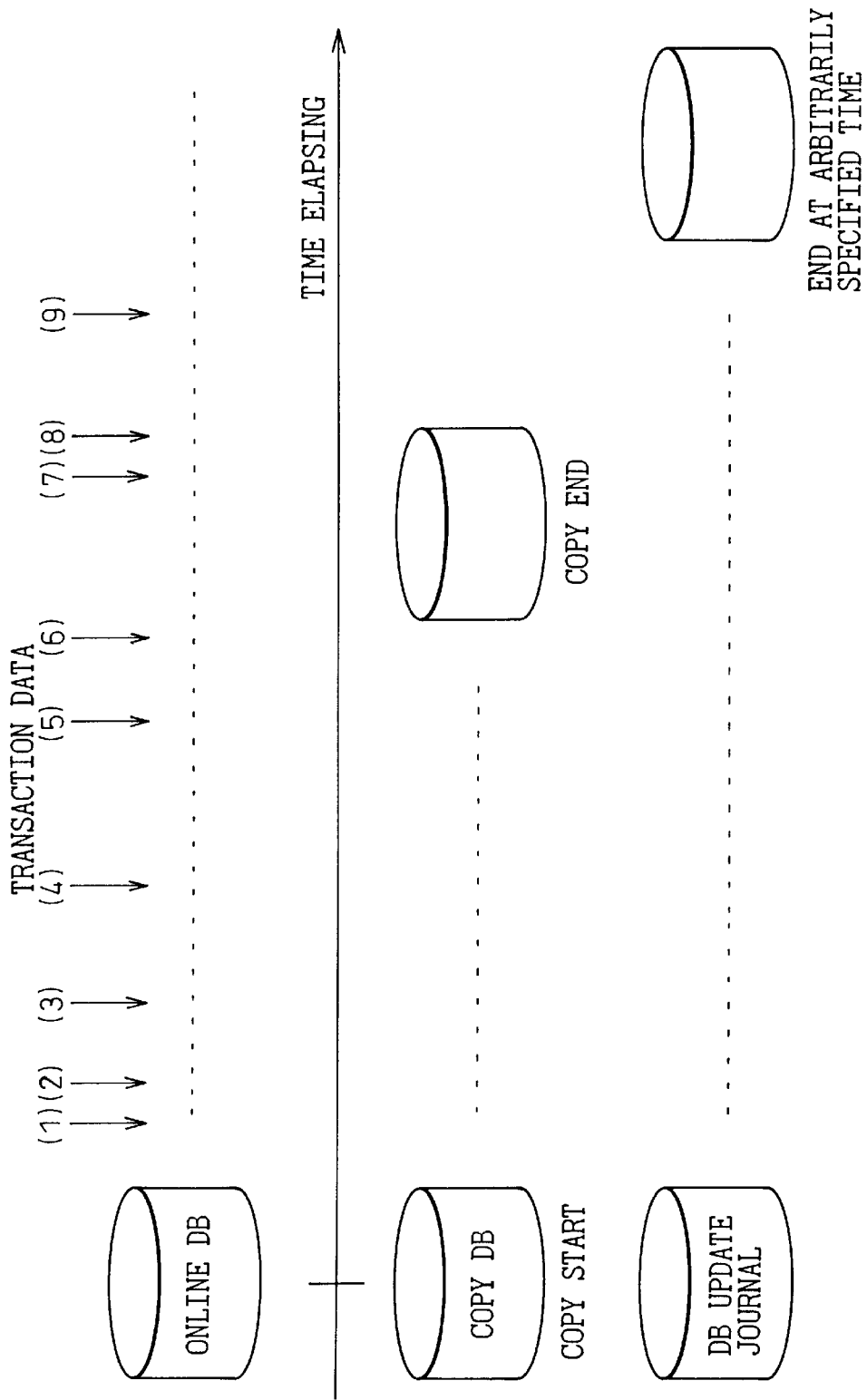

ON-LINE DATABASE DUPLICATION WITH INCORPORATION OF CONCURRENT DATABASE UPDATES

BACKGROUND OF THE INVENTION

1. Field of the Invention

The present invention relates to a technique for creating a logical duplicate database (including a partial duplication) for an online database during online service hours in an online database system operating, for example, on a 24-hour basis.

2. Description of the Related Art

With the recent diversification of social needs, etc., the service hours of online transaction processing systems based on databases (hereinafter abbreviated DBs) have become progressively longer. Under such circumstances, processing operations have to be done within limited hours after the online service hours. Such processing operations may include various batch processing operations performed using information maintained in the DB, DB maintenance operations (DB reorganization operations involving arranging overflow data, changing the data storage structure, etc.), or DB backup operations (creating a duplicate DB to provide against DB failure). The need therefore arises for a system that allows these processing operations to be done simultaneously and in parallel fashion during the online service hours.

Among the above processing operations, online DB backup has been accomplished in the prior art by a method such as described below. FIGS. 14A and 14B are conceptual diagrams illustrating the DB backup process performed during online processing.

FIG. 14A illustrates in time series fashion how updates made to an online DB by transaction data (1) to (9) are recorded in a journal file. At the same time, the contents of the online DB are copied in units of blocks when the online DB is being updated with the transaction data (1) to (9).

In journal recording, the write process is initiated at the same time as the copying process. The information recorded at this time includes, for each block for which the online DB is updated, the block number, updated data, and the physical location (address) of the updated data from the start address of the block. These are collectively called physical update data.

The block mentioned here refers to the unit in which data is transferred for reading or writing between a main storage device and a secondary storage device such as a magnetic disk. Each block is assigned a sequential block number.

Journaling is completed at an arbitrary time after the end of the copying process, the purpose being to create a backup DB for the online DB at that time. Based on the earlier mentioned copy DB and on the DB update journal, in which the updates made to the online DB have been recorded, the backup DB is created in accordance with the procedure as shown in FIG. 14B.

First, information on the timing for copying the online DB for each block is compared with information on the timing for acquiring the result of the online DB updating with the transaction data as a DB update journal. After the completion of the copy operation, a selected DB update journal is created by selecting only the journals from which the DB update journals have been acquired.

Next, using the information recorded in the selected DB update journal, the copy DB is updated. In this manner, the results of the DB updating by the transaction data that occurred after the copying are reflected in the copy DB. Thus, the creation of the backup DB is accomplished.

In the above DB backup operation, processing is performed in units of blocks. Operations concerning the contents of the records (data storage structure) within each block are performed using only the physical position information of each record from the start address of the block. In other words, all processing is done by so-called physical data processing that has no regard to the contents. Accordingly, the backup DB created by the above method is exactly the same as the online DB in the data storage structure as well as in the physical arrangement of the records within each block.

The various batch processing operations and DB maintenance operations mentioned earlier are performed based on the thus created backup DB. While the above DB backup operation was performed by physical data processing, the batch processing and maintenance operations are performed based on the logical data structure. Such a logical data structure is shown in the specific example of the DB storage structure illustrated in FIG. 15.

More specifically, FIG. 15 shows a specific example of a customer DB (data set) used in a banking institution. In the upper part of FIG. 15 is shown the data structure of the DB which consists of a customer management record at the highest level, management records for customer's accounts such as ordinary savings and time savings at the next lower level, and transaction activity records for the respective savings accounts at the further lower level in an address chain fashion.

The lower part of FIG. 15 shows how the actual customer records organized in such a data structure are stored in a block of the data set. Though not shown in the figure, there is also an index field which stores the relationship between an entry key to each data record and its block number in the form of a table.

In the thus organized DB, when creating a separate DB by extracting only the records relating to the customer's ordinary savings account, for example, block X is first read into memory by the index field using the customer's code. Then, by tracing the address chain in the order of customer record 1, ordinary savings account management record 1, ordinary savings activity record 1, and ordinary saving activity record 2, only the desired records are selected and written to a separate DB to accomplish the purpose.

In this way, when performing processing based on the logical data structure, processing of the records is done based on the association between the records using the address chain information. This has the advantage of being able to accomplish the addition, deletion, etc., of records, independently of the physical location (address) of each record within the block. Hereinafter, performing processing based on such a logical data structure will be referred to as logical data processing, as contrasted with the earlier described physical data processing.

As described above, the prior art DB backup process performed during online processing is physical data processing which is based on the physical data structure treating each block as a unit. Because of this physical data processing, the duplicated backup DB and the online DB necessarily become the same in the data storage structure as well as in the physical arrangement of records within each block. Such processing therefore has had the problem that a duplicate DB cannot be created by extracting partial data. That is, a separate DB containing only the records relating to ordinary savings accounts retrieved from the customer DB, as illustrated in the above example, cannot be extracted during online processing.

SUMMARY OF THE INVENTION

In view of the above situation, it is an object of the present invention to provide a means for creating a duplicate DB, including a partial duplication at an arbitrary instant in time, from an update DB during online transaction processing, etc.

It is another object of the present invention to allow the creation of a partial duplicate DB in a DB where a key uniquely identifying each record is not an essential condition.

It is a further object of the present invention to achieve quick duplication of an update journal while avoiding an effect on online processing.

The above problem is solved by an update database duplication system constructed as described below.

FIG. 1 is a diagram showing the configuration of a first aspect of the present invention.

According to the first aspect of the invention, there is provided a system for duplicating an update database in a computer, comprising: copying means for creating a copy database, including a partial copy, of the update database; journal selecting means for selecting data, related to parts of the copy database in which the copy has finished, from an update data journal of the update database that is made when the copy database is being copied by the copying means; and duplicating means for updating the contents of the copy database created by the copying means with the contents of the update data journal selected by the journal selecting means. In this configuration, a data range for the copying in the copying means is specified externally by logical data structure information, thus realizing easy creation of a partial duplicate DB at an arbitrary instant in time.

However, in a DB such as a network DB where a key uniquely identifying each record is not an essential condition, there is a desire to create a partial duplicate DB. For example, consider updating branch record 3 in an update DB of a ring configuration such as shown in FIG. 2. In such updating, an application program searches through the address chain from branch record 1 to branch record 2 and then to branch record 3 to obtain the position information of the branch record 3, and then updates the branch record 3 based on the position information. At this time, by only acquiring the update contents and position information of the branch record 3 as an update data journal, the copying means cannot determine the position of the branch record 3 since the physical structure of the update DB is different from that of the copy DB.

In view of this problem, the update database duplicating system of the present invention further comprises a record position correspondence table for managing correspondences between record position information in the update database and record position information in the duplicate database. Preferably, the record position correspondence table is held by selecting either a main memory or a nonvolatile medium for storage thereof.

On the other hand, the update data journal selected by the journal selecting means is input at high speed to the duplicating means while avoiding effects on online processing. At this time, if a technique is used that prepares multiple generations of the update data journal shown in FIG. 1, with an update data journal storage medium for each generation, and that inputs previous generations of the update data journal at a time to the duplicating means when a generation change occurs, there occurs a problem if the frequency of occurrence of the update data journal decreases, since the input timing is then spread out, with the result that the completion of the duplicate DB is delayed.

Furthermore, if a technique is used that inputs the update data journal shown in FIG. 1 one by one to the duplicating means as the update data journal occurs, online processing and input processing compete for the use of the update data journal storage medium, resulting in the problem that the online processing performance degrades when the frequency of occurrence of the update data journal is high.

In view of these problems, the update database duplicating system of the present invention further comprises collective input means for collectively inputting a plurality of journals from the update data journal; concurrent input means for concurrently inputting journals one at a time from the update data journal; journal input switching means for dynamically switching between the collective input means and the concurrent input means; and mode switching means for outputting a control journal for directing input mode switching. Preferably, the input mode switching is effected according to an initial mode specified externally by a control statement, an operating time segment specified externally by a control statement, or online processing load (the number of transactions per second).

According to the present invention, there is also provided, in a system for duplicating an update database in a computer, a recording medium recording a computer program for implementing in the computer a copying function for creating a copy database, including a partial copy, of the update database; a journal selecting function for selecting an update data journal recorded after the copying from within an update data journal of the update database during the copying; and a duplicating function for updating the contents of the copy database created by the copying function with the contents of the update data journal selected by the journal selecting function.

BRIEF DESCRIPTION OF THE DRAWINGS

FIG. 12B is the other part of a flowchart showing the processing flow of the sixth process.

FIGS. 14A and 14B are conceptual diagrams showing the creation of a backup DB according to the prior art.

DESCRIPTION OF THE PREFERRED EMBODIMENTS

An embodiment will be described below, using the creation of a duplicate DB for a customer DB in an online banking system as an example.

The customer DB handled in this system is usually organized by branch (region) and by customer and is stored on a magnetic storage device. For customer specific information including customer attribute information, savings account information containing transaction information for each account is stored for each financial product such as ordinary savings and time savings. These pieces of information, as well as loan information, are stored and managed for each customer.

According to the current practice banking institutions, on weekdays processing operations are performed using a weekday customer-DB in which the above-mentioned pieces of information are stored. On holidays, on the other hand, since only transactions on ordinary savings are handled, a holiday customer-DB is created in which only ordinary savings account information is stored. This holiday customer-DB is created from the customer DB by batch processing on the last business day of the week to prepare for transactions on holidays. This, coupled with various post-processing operations for online transactions, forces a very tight operating schedule on the bank staff on the last business day of the week.

In view of this situation, the purpose of the present invention is to make it possible to create such a holiday customer-DB from the online customer DB during online processing on the last business day of the week. That is, the present invention makes it possible to dynamically create a separate (duplicate) DB from a so-called update DB.

Figure 3:
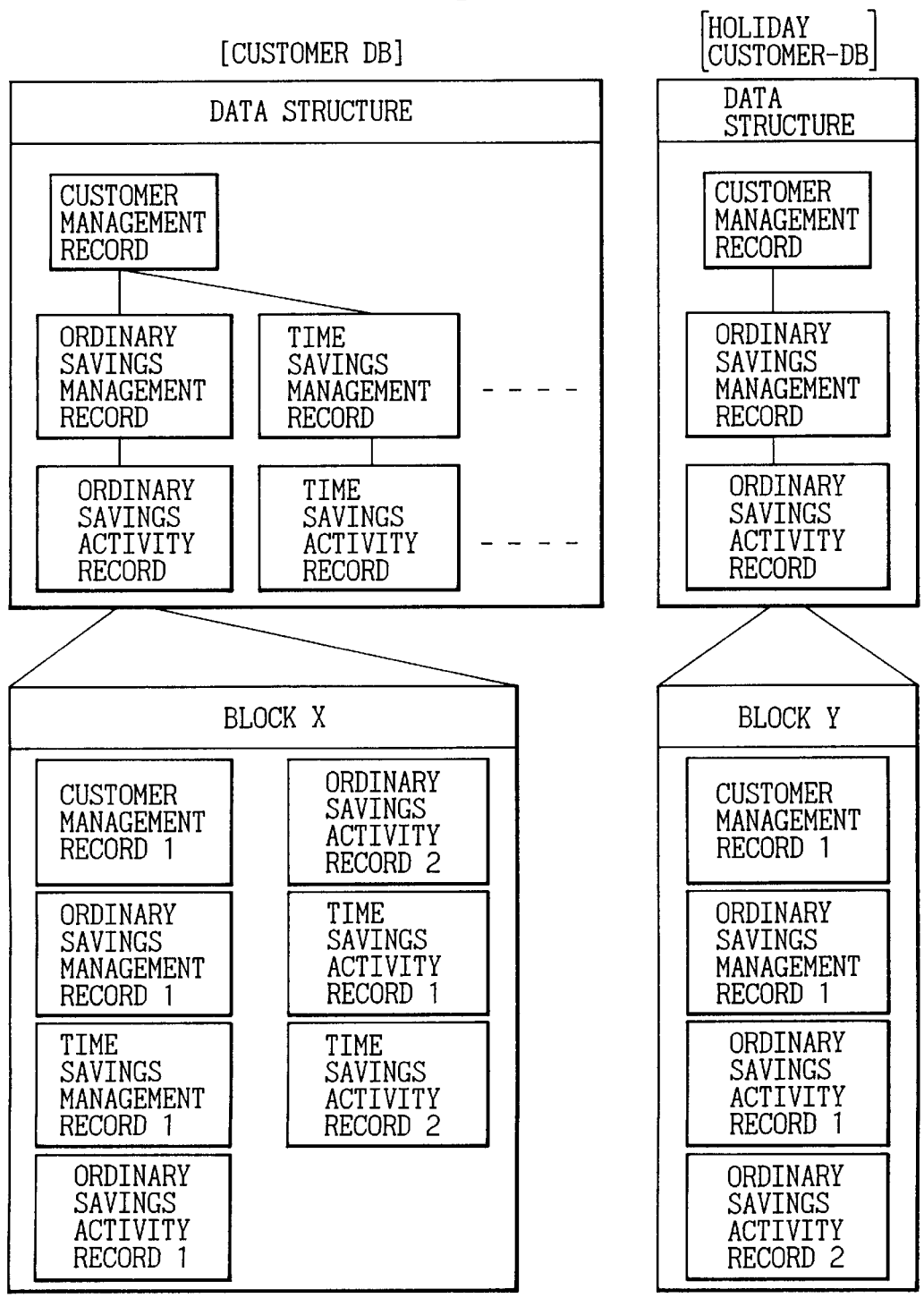
FIG. 3 is a diagram showing an example of the data structure of a duplicate DB created by extracting data from an update DB.
Figure 15:
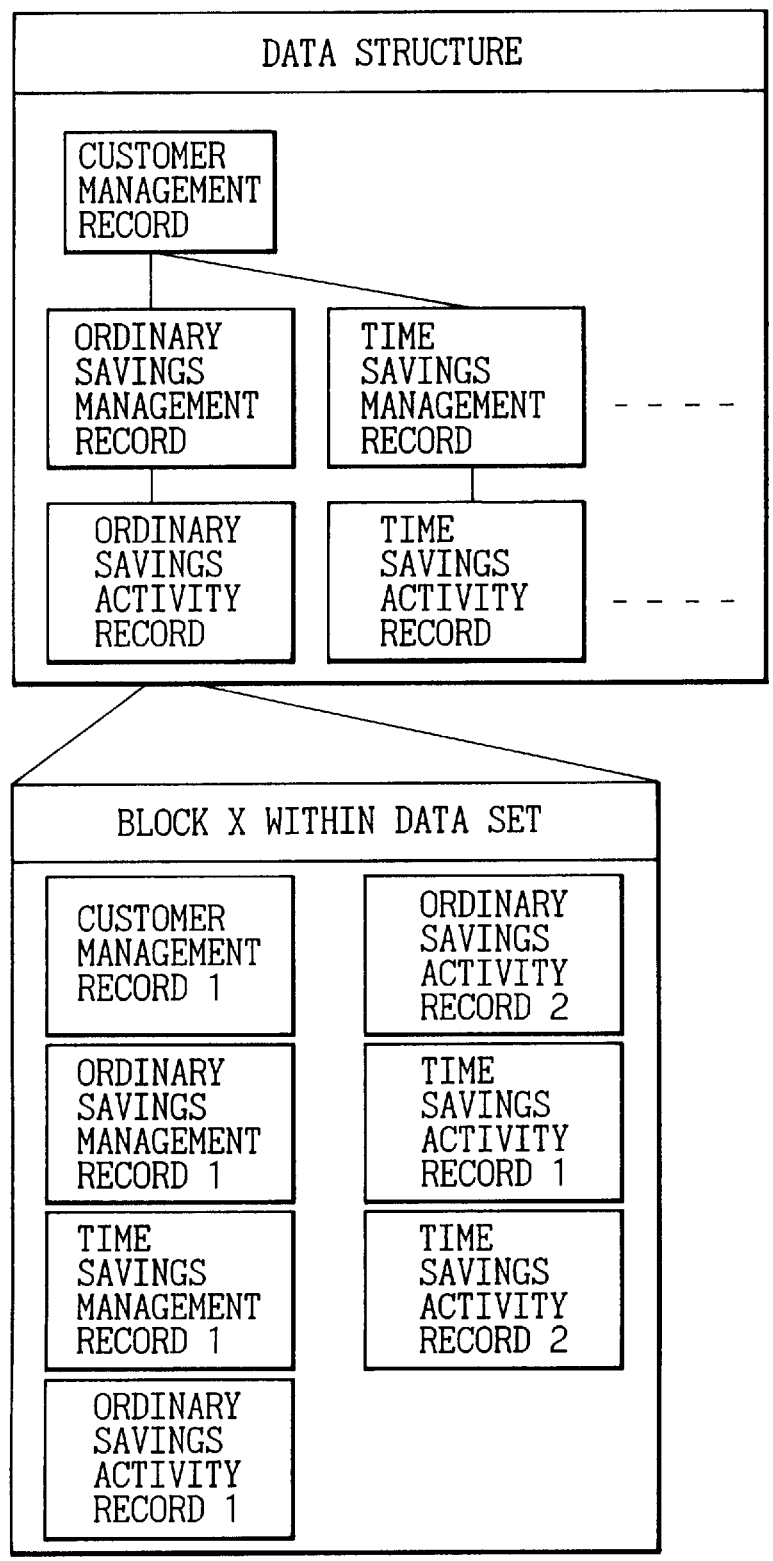
FIG. 15 is a diagram showing a specific example of the data storage structure of a DB.

FIG. 3 is a diagram showing an example of the data structure of a holiday customer-DB created by extracting only the ordinary savings account information from the online customer DB. The customer DB in the left side of FIG. 3 is the same in structure as that previously described in connection with FIG. 15, and an explanatory description thereof will be not be repeated here.

In the right side of FIG. 3 is shown the data structure of the holiday customer-DB. The upper part shows the data structure of the holiday DB, which consists of a customer management record at the highest level, an ordinary savings management record at the next lower level, and an ordinary savings activity record at the further lower level. The lower part shows how specific records are stored in a block as a data set on a magnetic storage device. The customer management record 1 recorded in block Y is address-chained to the customer's ordinary savings management record 1 at the next lower level, which is address-chained at the further lower level to the ordinary savings activity records 1 and 2 as individual transaction records. All the records for the customer thus are linked logically.

Next, a method for creating a partial duplicate DB, such as the holiday customer-DB, from an update DB, such as the first-described customer DB, will be described. It should be noted here that all processing described hereinafter is performed based on the previously described logical data processing. Also, the range for partial data extraction (extraction of ordinary savings-related records in the illustrated example) is specified based on the logical data structure information.

Figure 1:
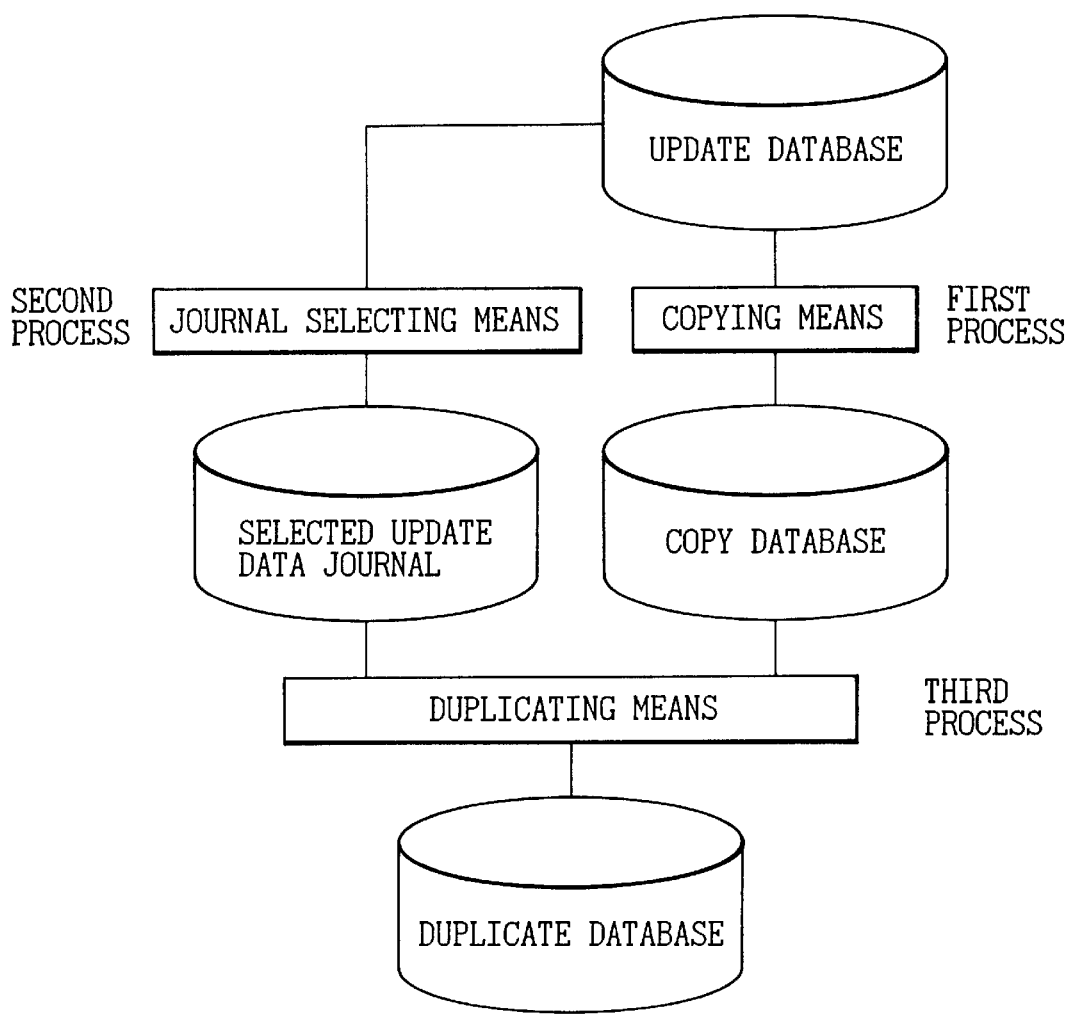
FIG. 1 is a diagram showing the configuration of a first aspect of the present invention.
Figure 2:
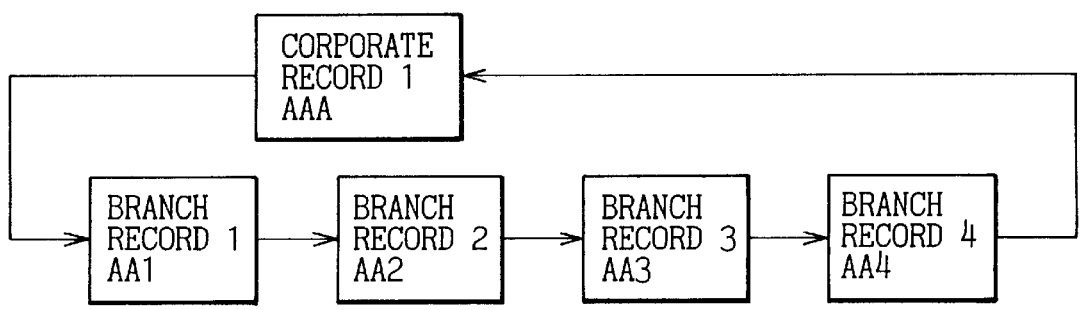
FIG. 2 is a diagram showing a specific example of an update DB of a ring configuration.

The duplicate DB creation process largely consists of three processes, as shown in FIG. 1. The first process is for creating a copy DB by logically copying the contents of the update DB in sequence on a block-by-block basis in accordance with the specification of the extraction range. The second process, which initiates processing synchronously with the copy operation in the first process and proceeds in parallel with the first process, is for journaling updates made to the update DB by the transactions occurring after the initiation of the processing. The second process is also for selecting, from among the thus journaled data, the data journaled after the block-by-block copy operation. As in the first process, the second process also is performed based on the logical data processing in accordance with the specification of the extraction range. The third process is for creating a duplicate DB for the extraction range by reflecting the contents of the journaled data selected by the second process in the contents of the copy DB created in the first process (update operation) and thereby maintaining consistency between the contents of the source update DB and the contents of the duplicate DB. These processes will be described below in sequence.

Figure 4:
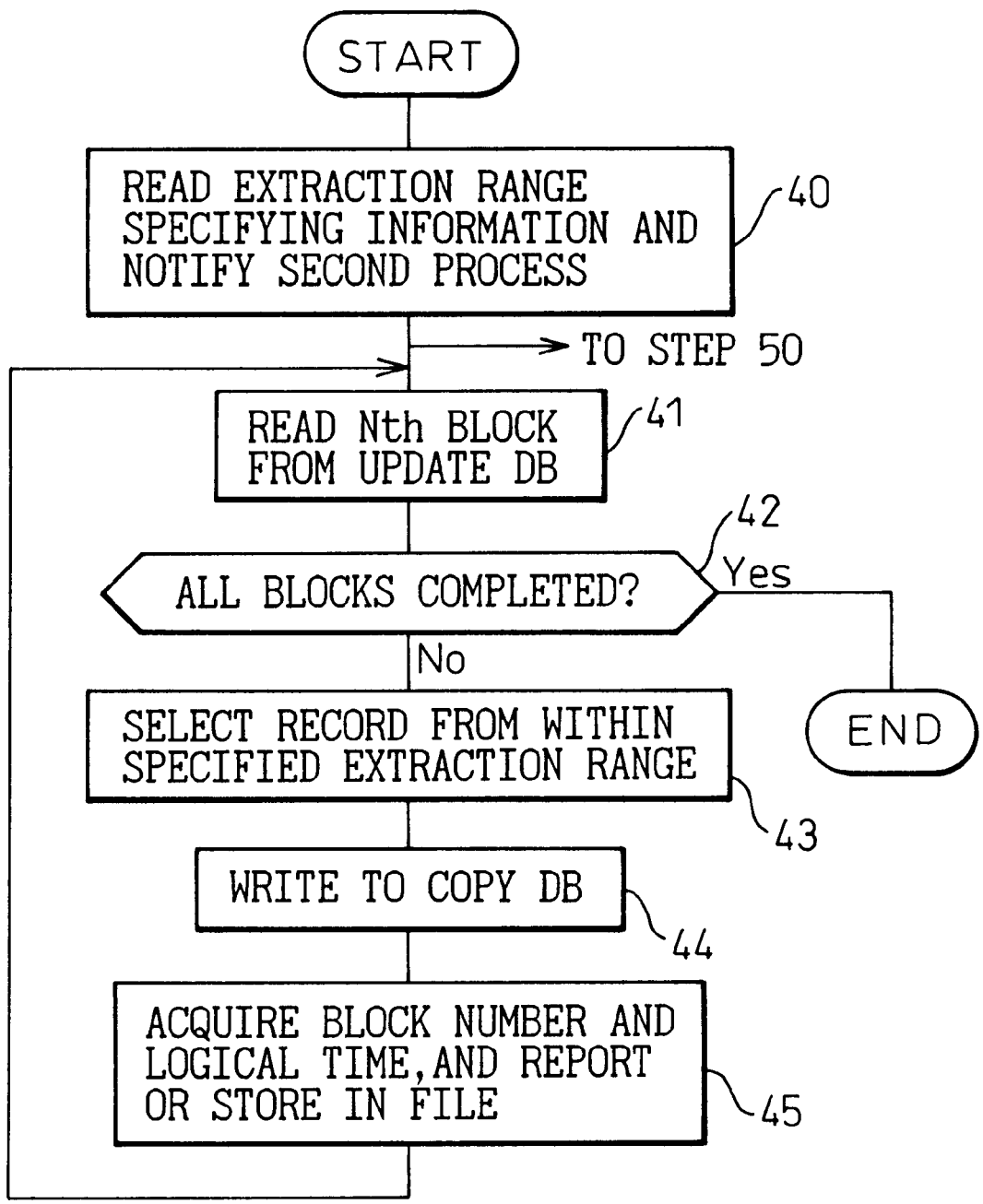
FIG. 4 is a flowchart showing the processing flow of a first process.

The copy operation in the first process is flowcharted in FIG. 4. For step 40, information is supplied externally as a control statement specifying the extraction range, for example, A Branch-customer management records—ordinary savings account management records—ordinary savings account activity records. In step 40, such information is read and, at the same time, a notification is sent to the second process described later. Next, in step 41, the update DB is read one block at a time in the sequence of block numbers.

In step 42, it is determined whether the final block has been read from the specified range. If the answer is NO, a record is selected from within the specified extraction range in step 43 and is written to the copy DB in step 44. Then, in step 45, the block number as position information and, if necessary, the logical time as time information (a timer counter holding the sequence from the start time) are acquired. These pieces of information are either reported to the second process, hereinafter described, or stored and accumulated as timing information in a timing file.

Next, the journal selection operation of the second process will be described. There are several methods to accomplish this process. Basically, the process concerns selecting only the update data journaled after the processing by the first process, from among the data updated against the update DB, as a result of the transactions occurring after the initiation of the processing. More specifically, in the selection operation of the second process, the block number as the position information and the logical time as the time information are used to determine whether the update occurred before or after the copy operation in the first process.

Figure 5:
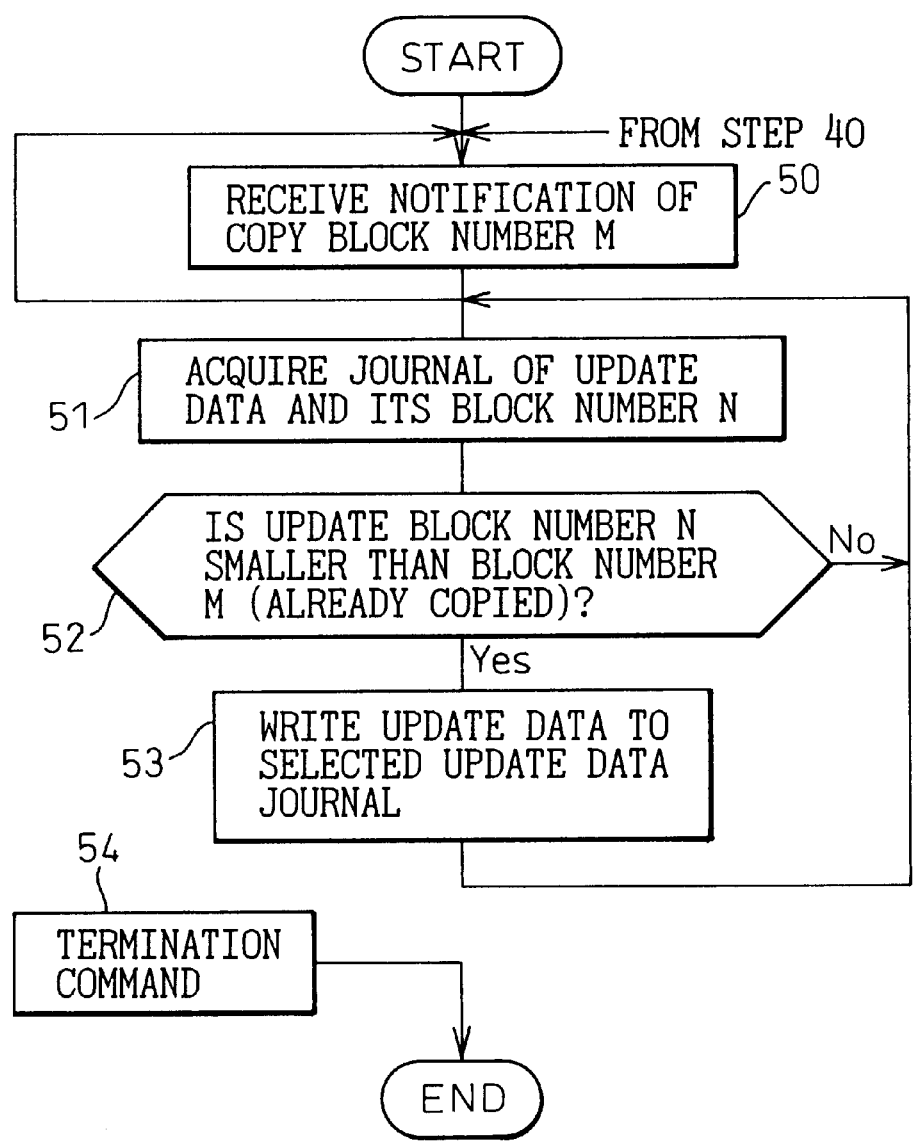
FIG. 5 is a flowchart (part 1) showing the processing flow of a second process.

In a first method, as each block is copied in the first process, the currently processed block number is reported from the first process. Based on this block number, only the update data journaled after the processing by the first process is dynamically selected for writing to the selected update data journal. The selection operation of the second process at this time is flowcharted in FIG. 5.

Though not shown in the figure, the information specifying the data extraction range is received from the first process at the beginning of the second process, and the subsequent processing is performed on the data within that range. First, in step 50, the block number M currently being processed by the first process for copying is received asynchronously with the processing in step 51 onward. When an access occurs to the update DB as a result of a transaction, in step 51 the journal of the record updated by the transaction is acquired (i.e., block number N of the updated record, logical time, entry key information, path information for reaching the updated record by address chain, the digit place within the updated record, the contents of the update, etc.) and in step 52 it is determined, based on the block number N of the updated record and the block number M being processed by the first process for copying at that time, whether the update block number N has already been copied. If the block number N has already been copied, this means that the data is one copied before the updating, and that the journaled update therefore needs to be reflected in that data, and in step 53 the updated data is written to the update data journal, after which the process returns to step 51 to wait for the next occurrence of access to the update DB. On the other hand, if it is determined in step 52 that the update block number N has not been copied yet, the process returns to step 51 without updating the journal. The process is terminated by an external command (step 54) at an arbitrary time after the completion of the copy operation in the first process.

In a second method, the acquisition of the update data journal of the update DB is performed in two stages; that is, in the first stage, all update data journals are acquired, and in the second stage, only the update data journaled after the copy operation in the first process are selected from among all the update data journals acquired in the first stage, and are written as the selected update data journal to the storage device. That is, only the update data journaled after the copy operation are selected from the update data journal containing records of all update data, and selected based on the timing file written in step 45 of the first process previously described in connection with FIG. 4; therefore, this can be said to be static selection of update data.

Figure 6:
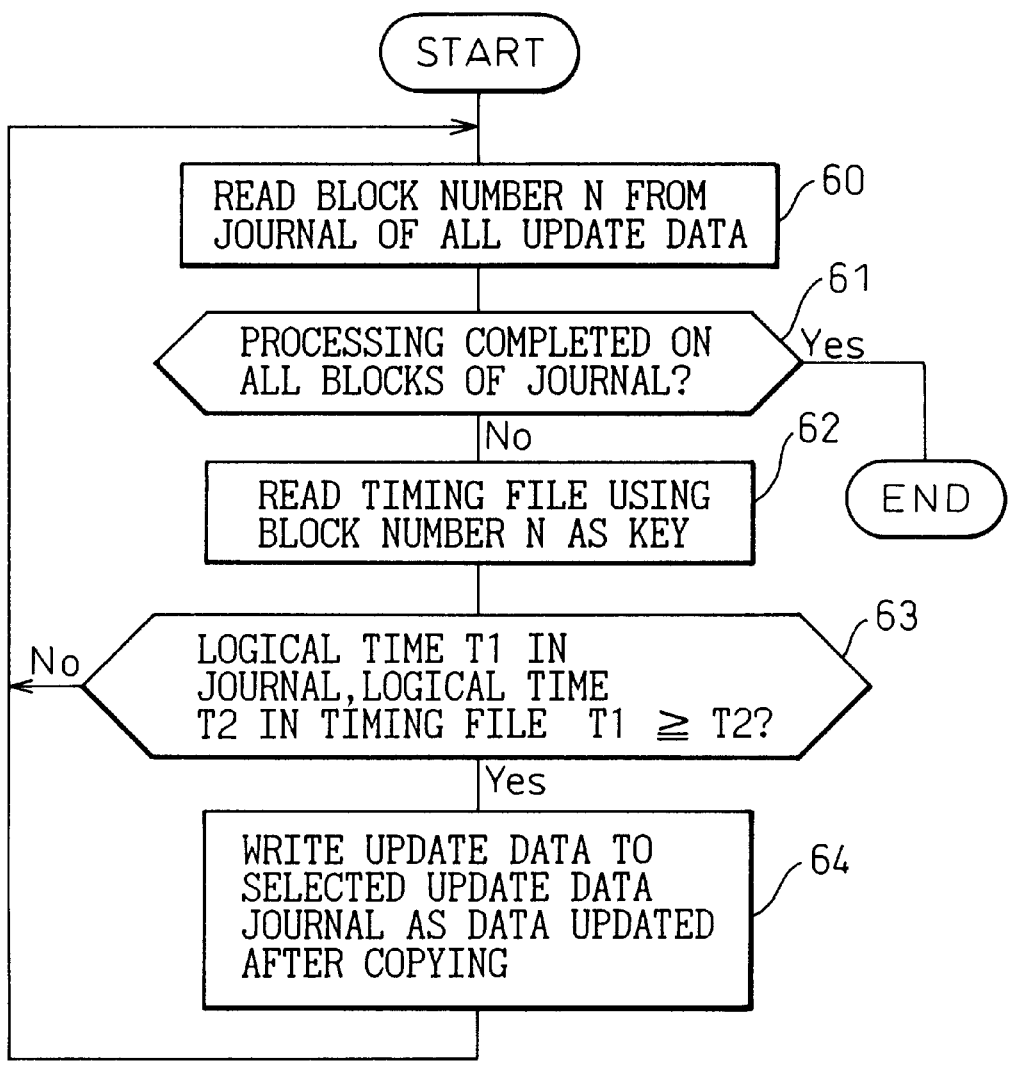
FIG. 6 is a flowchart (part 2) showing the processing flow of the second process.

The second method accomplishing the journal selection operation of the second process is flowcharted in FIG. 6. As in the first method, the data extraction range is received from the first process at the beginning of the second process, though not shown in the figure, and the subsequent processing is performed on the data within that range.

First, in step 60, block number N is read into memory from the journal containing records of all update data, and in step 61, it is determined whether the processing has been completed on all blocks. If not completed yet, then in step 62 the timing file is read using the block number N as the key, and in step 63 the logical time Ti recorded in the journal is compared with the logical time T2 recorded in the timing file; if $T \geq T2$, that is, if the copy operation of the first process is earlier in timing, the update data is selected as the update data that needs to be reflected in the copy DB, and in step 64 the update data is written to the selected update data journal before proceeding to process the next update data. In both of the first and second methods, during an access to the update DB, lock/unlock control is applied to the block being accessed (to inhibit an access to the block from another process), thereby eliminating potential conflicts in timing.

The processing in the second process can also be accomplished by a combination of the first and second methods or by other methods, but the point is how the selection of the update data journal is made by combining dynamic or static methods.

Figure 7:
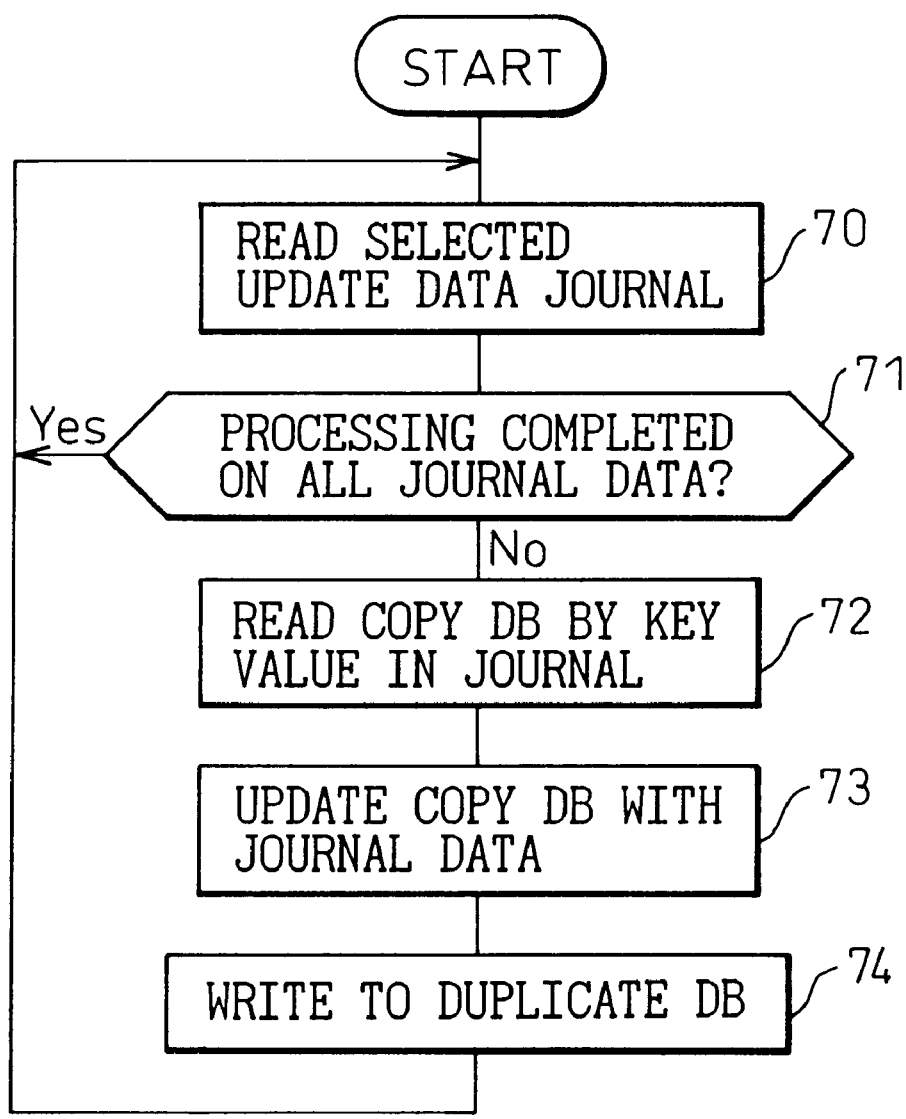
FIG. 7 is a flowchart showing the processing flow of a third process.

Next, the third process, that concerns the creation of the duplicate DB (the process for reflecting the contents of the selected journal data in the contents of the copy DB), will be described. FIG. 7 is a flowchart illustrating the details of this process. First, in step 70, the contents of the selected update data journal are read in sequence, and in step 71 it is determined whether the processing has been completed on all journal data; if not completed yet, then in step 72 the contents of the copy DB for the same customer are read into memory using a key value (for example, customer code in the customer management record in the foregoing example of a banking institution) recorded in the journal. Thereafter, in step 73, the contents of the copy DB for the same customer are updated accordingly by using the journal data, and in step 74, the updated contents are written to the duplicate DB which maintains consistency with the source update DB. The process then proceeds to process the next journal data, repeating the above steps until completing the processing of all journal data.

Figure 8:
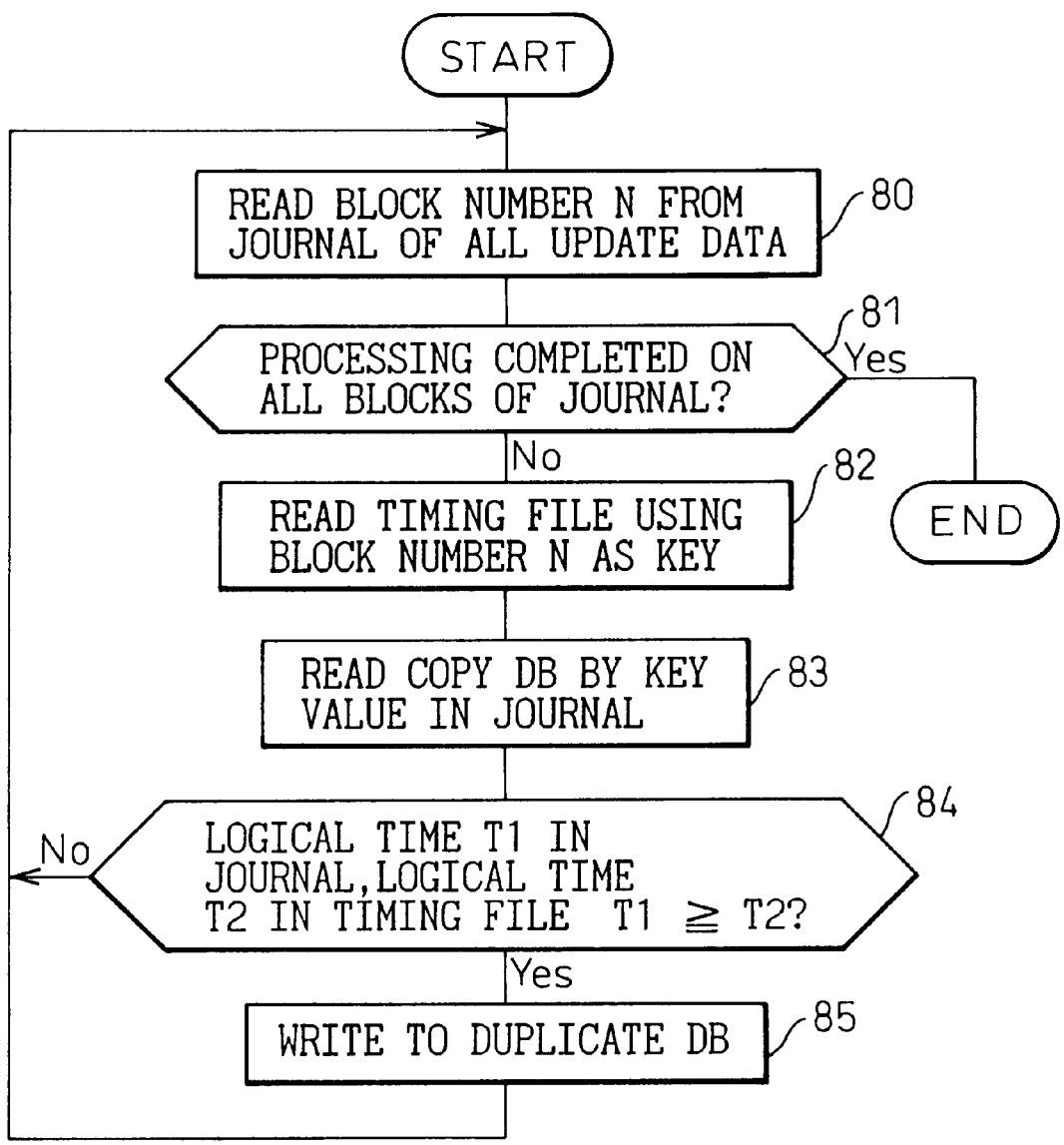
FIG. 8 is a flowchart combining the second process with the third process.

FIG. 8 is a flowchart combining the second process with the third process.

First, in step 80, block number N is read into memory from the journal containing records of all update data, and in step 81, it is determined whether the processing has been completed on all blocks. If not completed yet, then in step 82 the timing file is read using the block number N as the key, and in step 83 the contents of the copy DB for the same customer are read into memory using a key value recorded in the journal. Next, in step 84, the logical time T1 recorded in the journal is compared with the logical time T2 recorded in the timing file; if $T1 \geq T2$, that is, if the copy operation of the first process is earlier in timing, the update data is selected as the update data that needs to be reflected in the copy DB, and in step 85 the update data is written to the duplicate DB which maintains consistency with the source update DB. The process then proceeds to process the next journal data, repeating the above steps until completing the processing of all journal data.

By performing the first, second, and third processes, as described above, the desired DB can be created by extracting only the data within the specified extraction range in the update DB, for example, while the update DB is being used in the online system. This serves to drastically reduce the time currently required for batch processing in industries such as banking institutions where enormous amounts of data are handled.

The present embodiment has been described by taking a network DB as an example of the database, but the embodiment can be applied without any modification to other types of DB such as relational DBs.

Figure 9:
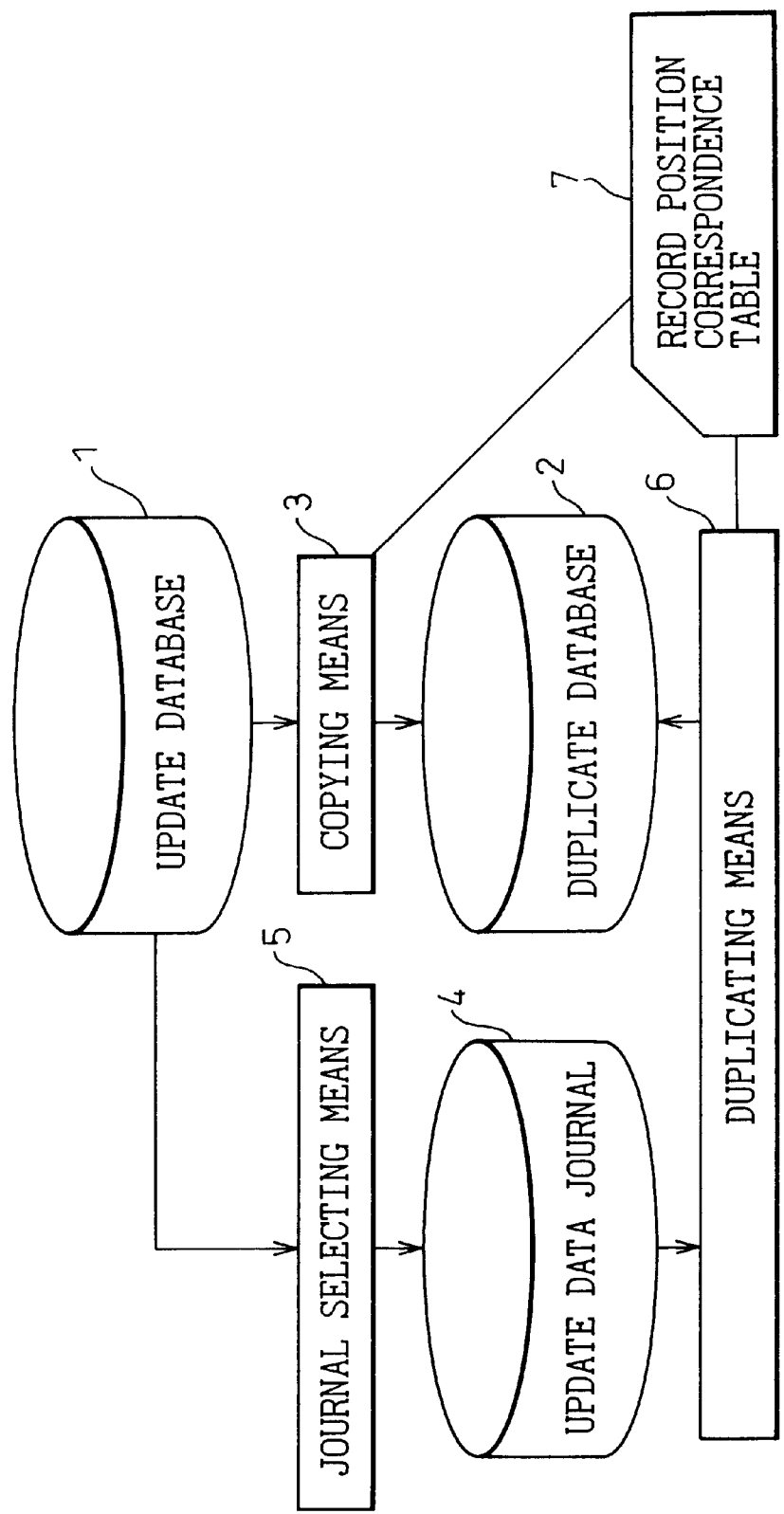
FIG. 9 is a diagram showing the configuration of a second aspect of the present invention.

FIG. 9 is a diagram showing the configuration of a second aspect of the present invention. Shown here is a system for duplicating an update database in a computer, which comprises a copying means 3 for creating a duplicate DB 2, including a partial copy, of the update DB 1 maintained in the computer; a journal selecting means S for selecting an update data journal 4 recorded after the copying from within an update journal of the update DB 1 during the copying; and a duplicating means 6 for updating the contents of the duplicate DB 2 created by the copying means 3 with the contents of the update data journal 4 selected by the journal selecting means 5. In this system, there is also provided a record position correspondence table 7 for managing correspondences between record position information in the update DB 1 and record position information in the duplicate DB 2, and using this table, the system realizes the creation of a partial duplicate DB in a DB where a key uniquely identifying each record is not an essential condition.

First, the duplicate DB creation process largely consists of three processes, i.e., the fourth to sixth processes, as shown in FIG. 9. The fourth process is for initializing the duplicate DB by logically copying the contents of the update DB in sequence on a block-by-block basis within the specified extraction range, and the fifth process, which initiates processing synchronously with the copy operation in the fourth process and proceeds in parallel with the fourth process, is for journaling updates made to the update DB by the transactions occurring after the initiation of the processing, and for selecting from among the thus journaled data the data journaled after the block-by-block copy operation. As in the fourth process, the fifth process also is performed based on the logical data processing in accordance with the specification of the extraction range. The sixth process is for completing the duplicate DB for the extraction range by reflecting the contents of the journaled data selected by the fifth process (update operation) and thereby maintaining consistency between the contents of the source update DB and the contents of the duplicate DB. These processes will be described below in sequence.

Figure 10:
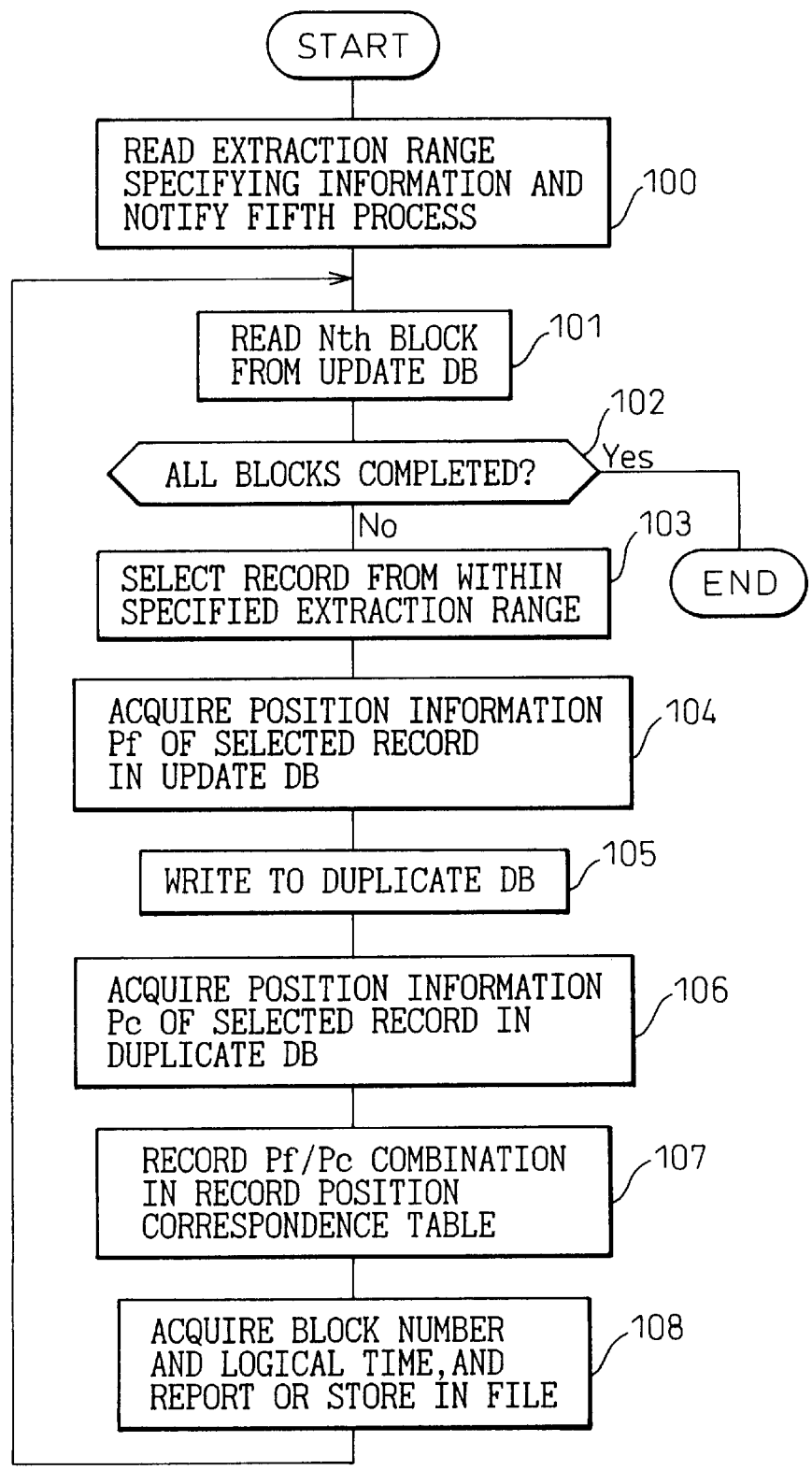
FIG. 10 is a flowchart showing the processing flow of a fourth process.

The copy operation in the fourth process is flowcharted in FIG. 10. In step 100, the extraction range supplied as a control statement is read and, at the same time, a notification is made to the fifth process described later. Next, in step 101, the update DB is read one block at a time in the sequence of block number. In step 102, it is determined whether the final block has been read from the specified range. If the answer is NO, a record is selected from within the specified extraction range in step 103, and position information Pf of the selected record in the update DB is acquired in step 104. Next, after writing the record to the duplicate DB in step 105, position information Pc of the record in the duplicate DB is acquired in step 106, and information defining the correspondence between the two pieces of position information, Pf and Pc, is recorded in the record position correspondence table in step 107. The record position correspondence table may be stored in the main memory to give precedence to the processing performance of the sixth process described later, or may be stored in a nonvolatile medium to enable the processing of the sixth process even in the case of a system failure. Finally, in step 108, the processed block number and, if necessary, logical time (a timer counter holding the sequence from the start time) are acquired, and these pieces of information are either reported to the fifth process hereinafter described or stored and accumulated in a timing file.

Next, the journal selection operation of the fifth process will be described. There are several methods to accomplish this process but, basically, the process concerns selecting only the update data journaled after the processing by the fourth process from among the data updated against the update DB as a result of the transactions occurring after the initiation of the processing; more specifically, in the selection operation of the fifth process, the block number indicating the physical position and the logical time as time information are used to determine whether the update occurred before or after the copy operation in the fourth process. Here, a description will be given of a method in which, as each block is copied in the fourth process, the currently processed block number is reported from the fourth process and, based on this block number, only the update data journaled after the processing by the fourth process is dynamically selected for writing to the selected update data journal.

Figure 11:
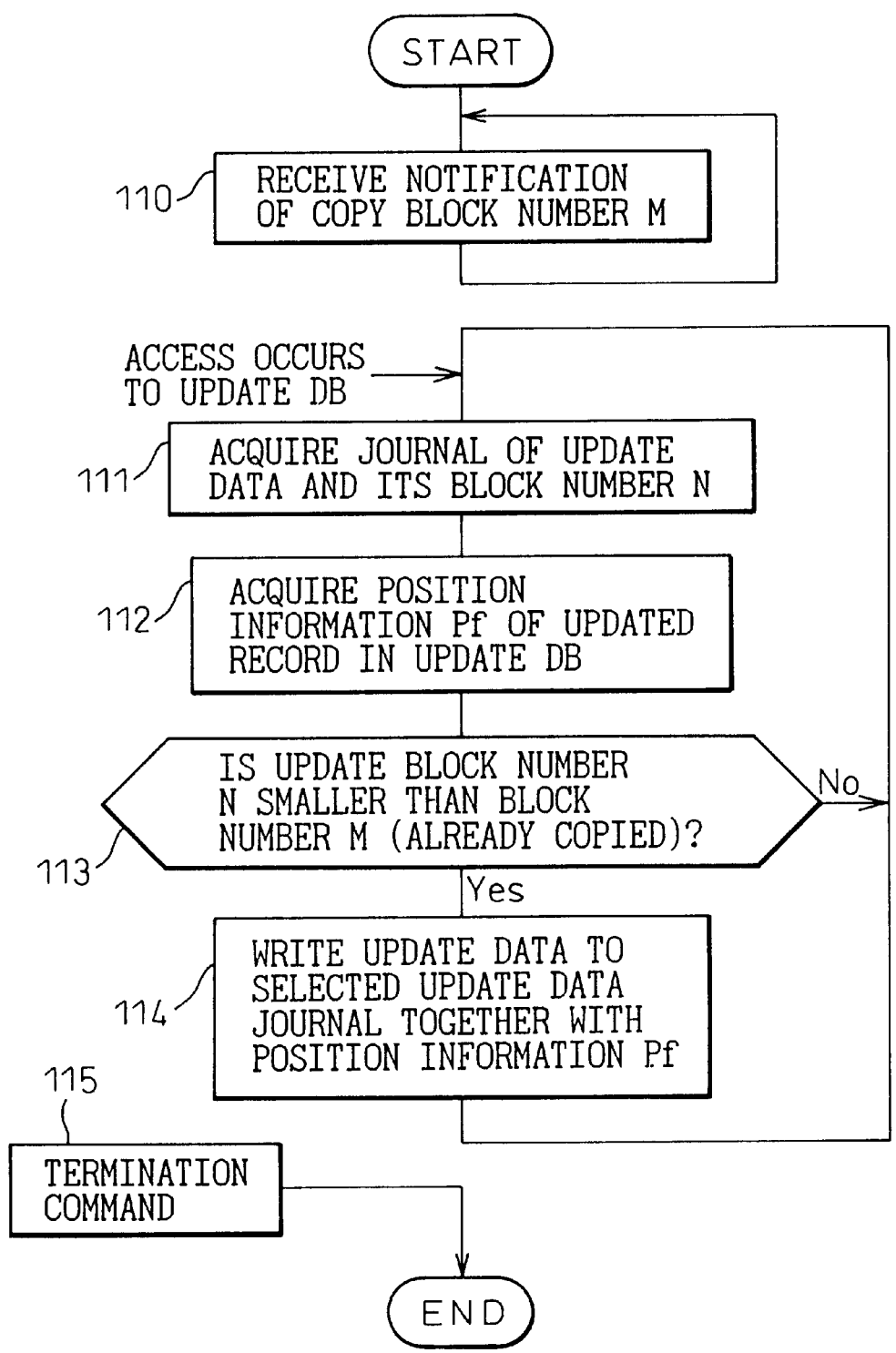
FIG. 11 is a flowchart showing the processing flow of a fifth process.

The selection operation of the fifth process at this time is flowcharted in FIG. 11. First, in step 110, the block number M currently being processed by the fourth process for copying is received asynchronously with the processing in step 111 onward. When an access occurs to the update DB as a result of a transaction, in step 111 the journal of the record updated by the transaction is acquired (i.e., block number N of the updated record, logical time, entry key information, the digit place within the updated record, the contents of the update, etc.). In step 112, the position information Pf of the updated record in the update DB is acquired. Then, in step 113 it is determined, based on the block number N of the updated record and the block number M being processed by the fourth process for copying at that time, whether the update block number N has already been copied. If the block number N has already been copied, this means that the data is one copied before the updating, and that the journaled update therefore needs to be reflected in that data, and in step 114 the updated data is written to the update data journal together with the position information Pf, after which the process returns to the position before step 111 to wait for the next occurrence of access to the update DB. On the other hand, if it is determined in step 113 that the update block number N has not been copied yet, the process returns to the position before step 111 without updating the journal. The process is terminated by an external command at an arbitrary time after the completion of the copy operation in the fourth process.

Figure 12A:
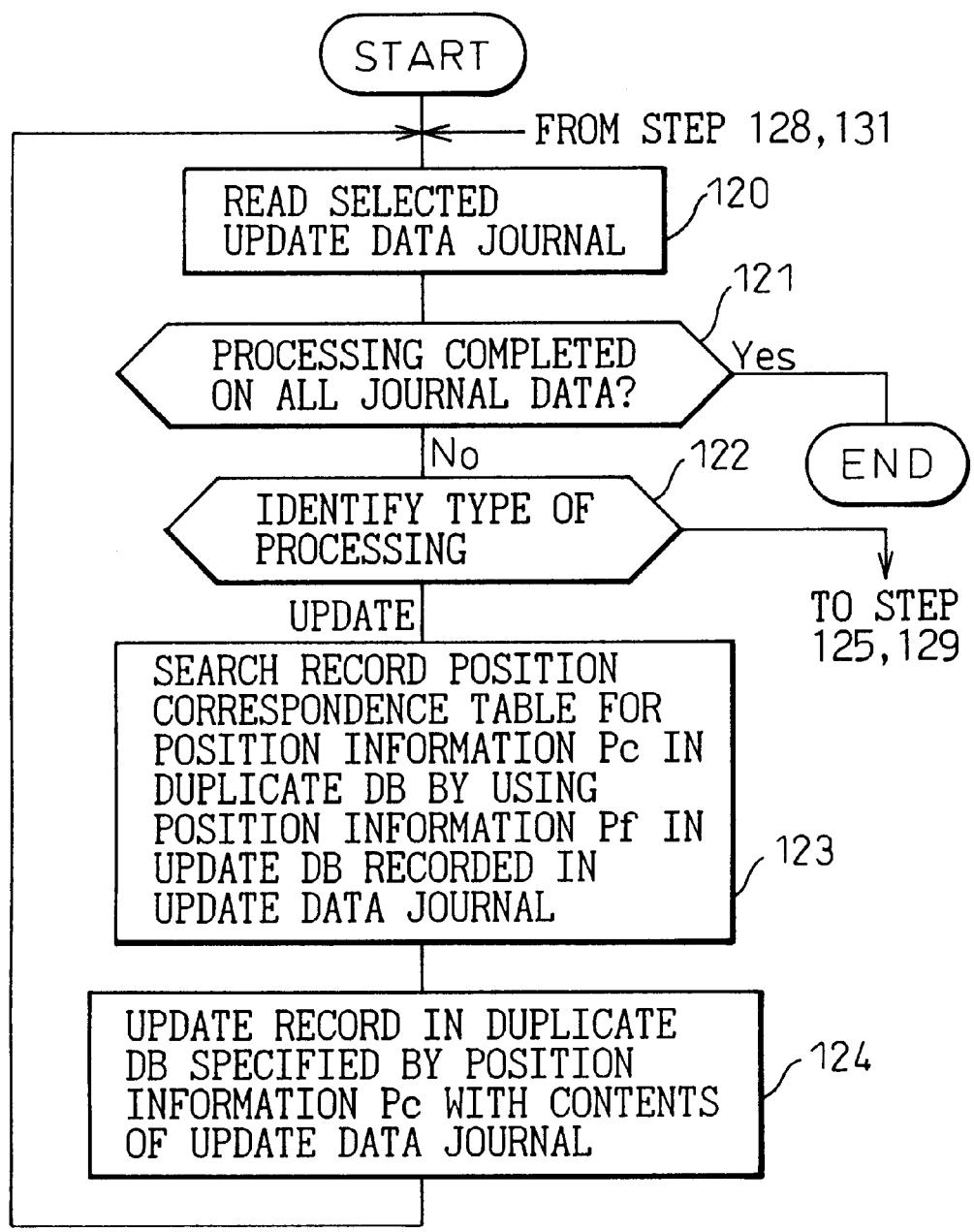
FIG. 12A is one part of a flowchart showing the processing flow of a sixth process.

Next, the sixth process will be described that concerns the completion of the duplicate DB (the process for reflecting the contents of the selected journal data in the contents of the duplicate DB). FIGS. 12A and 12B are flowcharts illustrating the details of this process. First, in step 120, the contents of the selected update data journal are read in sequence, and in step 121 it is determined whether the processing has been completed on all journal data; if not completed yet, the type of update is identified in step 122. When updating an existing record, in step 123 the record position correspondence table is searched for the position information Pc of the record in the duplicate DB by using the record position information Pf in the update DB recorded in the update data journal. Then, in step 124, the contents of the record in the duplicate DB are updated with the contents of the update data journal on the basis of the position information Pc. When adding a new record, first the record position information Pf in the update DB recorded in the update data journal is acquired in step 125. Then, in step 126, the new record is added to the duplicate DB, and in step 127, the position information Pc of the added record in the duplicate DB is acquired; after that, in step 128, the combination of Pf and Pc is added to the record position correspondence table. When deleting a record, in step 129 the record position correspondence table is searched for the position information Pc of the record in the duplicate DB by using the record position information Pf in the update DB recorded in the update data journal. Then, in step 130 the record is deleted from the duplicate DB based on the position information Pc, after which, in step 131, the combination associated with the deleted record is deleted from the record position correspondence table.

Next, a description will be given of means for inputting the update data journal selected by the journal selecting means at high speed to the duplicating means while avoiding effects on online processing.

Figure 13:
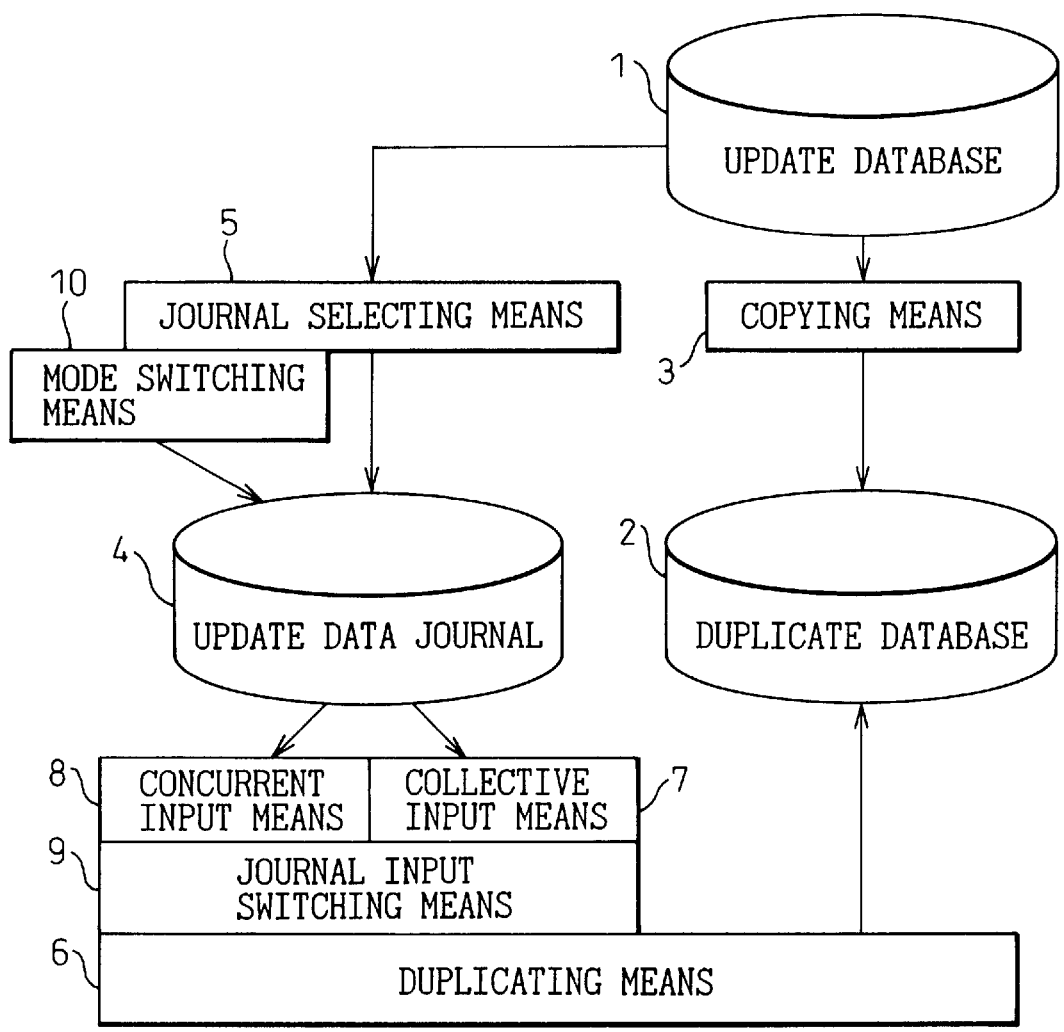
FIG. 13 is a diagram showing the configuration of a third aspect of the present invention.
Figure 14B:
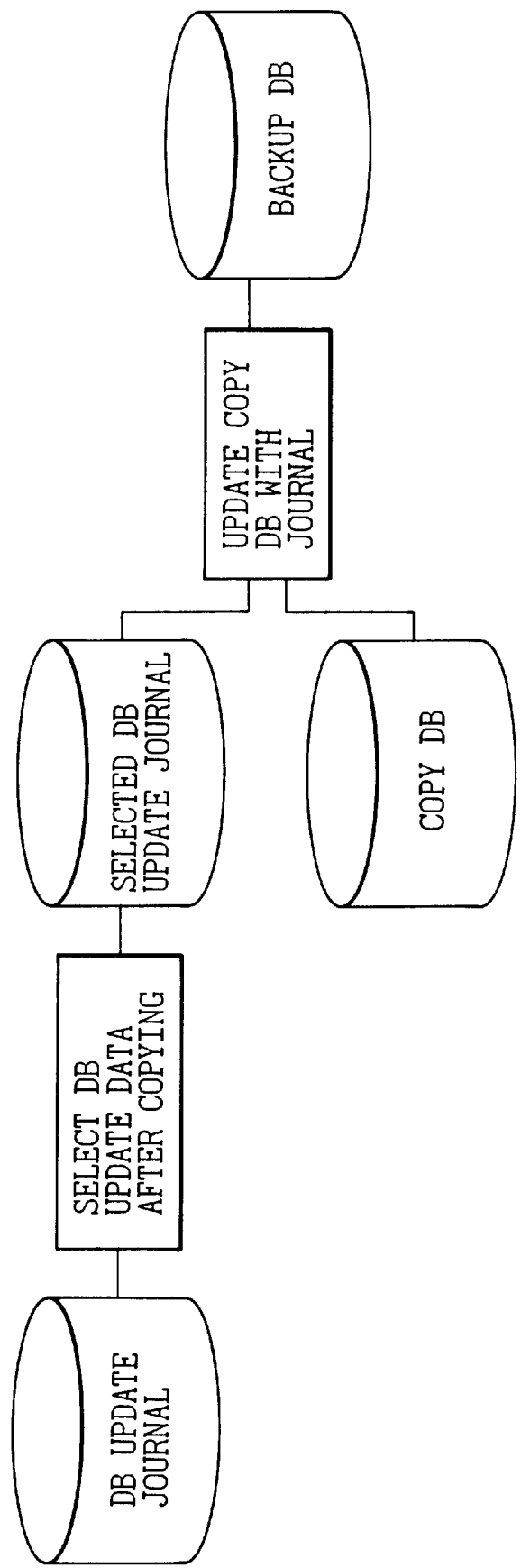

FIG. 13 is a diagram showing the configuration of a third aspect of the present invention. Shown here is a system for duplicating an update database in a computer, which comprises a copying means 3 for creating a duplicate DB 2, including a partial copy, of the update DB 1 maintained in the computer; a journal selecting means 5 for selecting an update data journal 4 recorded after the copying from within an update journal of the update DB 1 during the copying; and a duplicating means 6 for updating the contents of the duplicate DB 2 created by the copying means with the contents of the update data journal 4 selected by the journal selecting means 5. The system further comprises a collective input means 7 for collectively inputting a plurality of journals from the update data journal 4, a concurrent input means 8 for concurrently inputting journals one at a time from the update data journal 4, a journal input switching means 9 for dynamically switching between the collective input means 7 and the concurrent input means 8, and a mode switching means 10 for outputting a control journal for directing input mode switching; with these means, the system achieves the configuration in which the update data journal selected by the journal selecting means 5 is input at high speed by the duplicating means 6 while avoiding effects on online processing.

The journal input switching means 9 and the mode switching means 10 will be described below.

When the control journal is input that directs the switching of the input mode, the journal input switching means 9 activates either the collective input means 7 or the concurrent input means 8 in accordance with the specified mode.

The mode switching means 10 outputs the control journal for directing the switching of the input mode to the update data journal 4 when any of the following events has occurred.

When the duplication of the update DB is started, a desired input mode is given externally by a control statement.

When a predetermined operating time segment is entered, time for switching from the collective input mode to the concurrent input mode is given externally by a control statement.

When the online processing load has dropped below a predetermined value (the number of transactions per second is given externally by a control statement), the input mode is switched to the concurrent input mode, or when the load has exceeded a predetermined value (the number of transactions per second is given externally by a control statement), the input mode is switched to the collective input mode.

As described above, according to the present invention, effects on the online system operation can be minimized by performing concurrent processing when the online load is high and batch (collective) processing when the online load is low.

Furthermore, according to the present invention, when it is desired to retrieve information required for a particular service, if the information is distributed among various locations, for example, through a network, the information can be collected and stored in one file on one disk (for backup) on an online basis.

As is apparent from the above description, according to the present invention, since a partial duplicate DB at an arbitrary instant in time can be created easily without suspending access operations to the update DB, for example, during online transaction processing, enormous industrial effects are offered in that not only the time required for various batch processing operations performed using the update DB can be reduced but, in computer operation, the burden of operation staff can also be reduced by relieving them of time constraints for processing operations.

What is claimed is:

1. A system for duplicating an update database in a computer during online processing, comprising:
    a first unit to create at least a copy database by logically copying contents in the update database, in sequence on a block-by-block basis in accordance with a specification of a desired extraction range, during online processing, regardless of whether the physical data structure of the update database is not the same as that of the copy database;
    a second unit to create selected journal data by recording an update data journal of the update database caused by transactions while copying the contents of the update database in a journal file, and by selecting data relating to parts of the copy database in which the copy has finished from the update data journal; and
    a third unit to create a duplicate database, from the copy database created by the first unit and the selected journal data created by the second unit.

2. A system for duplicating an update database according to claim 1, wherein database processing in the first, second, and third units is performed based on logical data structure information of the database.

3. A system for duplicating an update database according to claim 2, wherein a data range for the copying in the first unit is specified externally by the logical data structure information.

4. A system for duplicating an update database according to claim 2, wherein in the second unit, the selection of the update data is performed by using position information.

5. A system for duplicating an update database according to claim 2, wherein in the second unit, the selection of the update data is performed by using time information.

6. A system for duplicating an update database according to claim 2, further comprising a record position correspondence table for managing correspondences between record position information in the update database and record position information in the duplicate database.

7. A system for duplicating an update database according to claim 6, wherein the record position correspondence table is held by selecting either a main memory or a nonvolatile medium for storage thereof.

8. A system for duplicating an update database according to claim 1, further comprising:
    a collective input unit for collectively inputting a plurality of journals from the update data journal;
    a sequential input unit for sequentially inputting journals one at a time from the update data journal;
    a journal input switching unit for dynamically switching between the collective input unit and the concurrent input unit; and
    a mode switching unit for outputting a control journal for directing input mode switching.

9. A system for duplicating an update database according to claim 8, wherein the input mode switching is effected according to an initial mode specified externally by a control statement, an operating time segment specified externally by a control statement, or an online processing load.

10. A recording medium recording a computer program for duplicating an update database in a computer during online processing the computer program comprising the steps of:
    creating at least a copy database by logically copying contents in the update database, in sequence on a block-by-block basis in accordance with a specification of a desired extraction range, during online processing, regardless of whether the physical data structure of the update database is not the same as that of the copy database;

selecting journal data by recording an update data journal of the update database caused by transactions while copying the contents of the update database in a journal file, and by selecting data relating to parts of the copy database in which the copy has finished from the update data journal; and creating a duplicate database, from the copy database created in the copy database creating step and the selected journal data created in the journal data selecting step.

11. An update database duplicating method, comprising:

creating a copy database during online processing by logically copying contents in an update database, in sequence on a block-by-block basis in accordance with a specification of a desired extraction range, a physical data structure of the copy database being independent of a physical data structure of the update database;

creating selected journal data by recording an update data journal for transactions while copying the contents of the update database, and by selecting from the update data journal data relating to parts of the copy database for which the copying has finished; and creating a duplicate database by modifying the copy database in accordance with the selected journal data.

12. An update database duplicating method according to claim 11, wherein the copy database creating process, the selected journal data creating process, and the duplicate database creating process are performed based on logical data structure information of the update database.

13. An update database duplicating method according the claim 12, wherein database processing in the copy database creating operation, the selected journal data creating operation, and the duplicate database creating operation is performed based on logical data structure information of the update database.

14. An update database duplicating method according to claim 13, wherein a data range for the copying operation is specified externally by the logical data structure information.

15. An update database duplicating method according to claim 13, wherein the selected journal data is selected using position information.

16. An update database duplicating method according to claim 13, wherein the selected journal data is selected using time information.

17. An update database duplicating method according to claim 13, further comprising managing correspondences between record position information in the update database and record position information in the duplicate database using a record position correspondence table.

18. An update database duplicating method according to claim 17, wherein the record position correspondence table is maintained by selecting a main memory or a nonvolatile medium for storage thereof.

19. An update database duplicating method according to claim 12, further comprising:

collectively inputting a plurality of journals from the update data journal responsive to receipt of a collective input instruction;

sequentially inputting journals one at a time from the update data journal responsive to receipt of a sequential input instruction;

dynamically switching between collective input and sequential input responsive to input mode switching control; and outputting a control journal for controlling the input mode switching by a collective input instruction or a sequential input instruction.

20. An update database duplicating method according to claim 19, wherein the input mode switching is carried out according to an initial mode specified externally by a control statement, an operating time segment specified externally by a control segment, or an online processing load.

* * * * *